US009287708B2

(12) United States Patent
Simon et al.

(10) Patent No.: US 9,287,708 B2
(45) Date of Patent: Mar. 15, 2016

(54) ACTUATOR AND ENERGY MANAGEMENT SYSTEM COMPRISING SUCH ACTUATORS

(75) Inventors: Helmut Simon, Argenbühl (DE); Armin Leonhardt, Wangen (DE); Werner Kaps, Weiler-Simmerberg (DE)

(73) Assignee: Viessmann Hausautomation GmbH, Wangen (DE)

( * ) Notice: Subject to any disclaimer, the term of this patent is extended or adjusted under 35 U.S.C. 154(b) by 955 days.

(21) Appl. No.: 13/167,947

(22) Filed: Jun. 24, 2011

(65) Prior Publication Data
US 2012/0019066 A1    Jan. 26, 2012

(30) Foreign Application Priority Data

Jun. 24, 2010   (DE) .......................... 10 2010 024 992

(51) Int. Cl.
  *H02J 3/14*   (2006.01)
  *H02J 13/00*   (2006.01)
(52) U.S. Cl.
  CPC ............... *H02J 3/14* (2013.01); *H02J 13/0062* (2013.01); *H02J 13/0075* (2013.01); *H02J 2003/143* (2013.01); *Y02B 70/3225* (2013.01); *Y02B 70/3266* (2013.01); *Y02B 90/2638* (2013.01); *Y02B 90/2653* (2013.01); *Y04S 20/222* (2013.01); *Y04S 20/242* (2013.01); *Y04S 40/124* (2013.01); *Y04S 40/126* (2013.01); *Y10T 307/406* (2015.04)
(58) Field of Classification Search
  CPC .......................................................... H02J 3/14
  USPC .......................................................... 307/31
  See application file for complete search history.

(56) References Cited

U.S. PATENT DOCUMENTS

| 4,445,049 A * | 4/1984 | Steigerwald ........ H02M 3/3155 307/45 |
| 4,977,353 A | 12/1990 | Helal et al. |
| 5,572,438 A * | 11/1996 | Ehlers ................ G01R 21/133 307/37 |
| 6,466,539 B1 | 10/2002 | Kramer et al. |
| 6,836,080 B2 * | 12/2004 | Kazanov ............... H05B 39/08 315/294 |
| 2010/0001591 A1 * | 1/2010 | Hani ................... H05B 37/0245 307/140 |
| 2010/0070217 A1 | 3/2010 | Shimada et al. |

FOREIGN PATENT DOCUMENTS

| DE | 19643092 A1 | 4/1998 | |
| DE | 29817814 U1 | 1/1999 | |
| DE | 19747157 A1 * | 4/1999 | ............... H02J 3/14 |
| DE | 69603155 T2 | 2/2000 | |
| DE | 10316008 A1 | 11/2004 | |
| DE | 202007017558 U1 | 4/2009 | |
| EP | 0415621 A2 | 3/1991 | |
| EP | 0801836 B1 | 7/1997 | |
| GB | 2458158 A | 9/2009 | |

* cited by examiner

*Primary Examiner* — Rexford Barnie
*Assistant Examiner* — Joseph Inge
(74) *Attorney, Agent, or Firm* — Laurence A. Greenberg; Werner H. Stemer; Ralph E. Locher

(57) ABSTRACT

An actuator for the power control of at least one connected load has a load detection device for detecting a magnitude of a load and/or a type of a load of the at least one as a measurement variable relating to the load of the at least one consumer. A communication interface receives at least one manipulated variable for the power control of the at least one consumer and transmits the measurement variable detected by the load detection device. Actuators of this type may be integrated into an energy management system, such as of a building automation system, for example.

18 Claims, 2 Drawing Sheets

ACTUATOR AND ENERGY MANAGEMENT SYSTEM COMPRISING SUCH ACTUATORS

CROSS-REFERENCE TO RELATED APPLICATION

Figure 1:
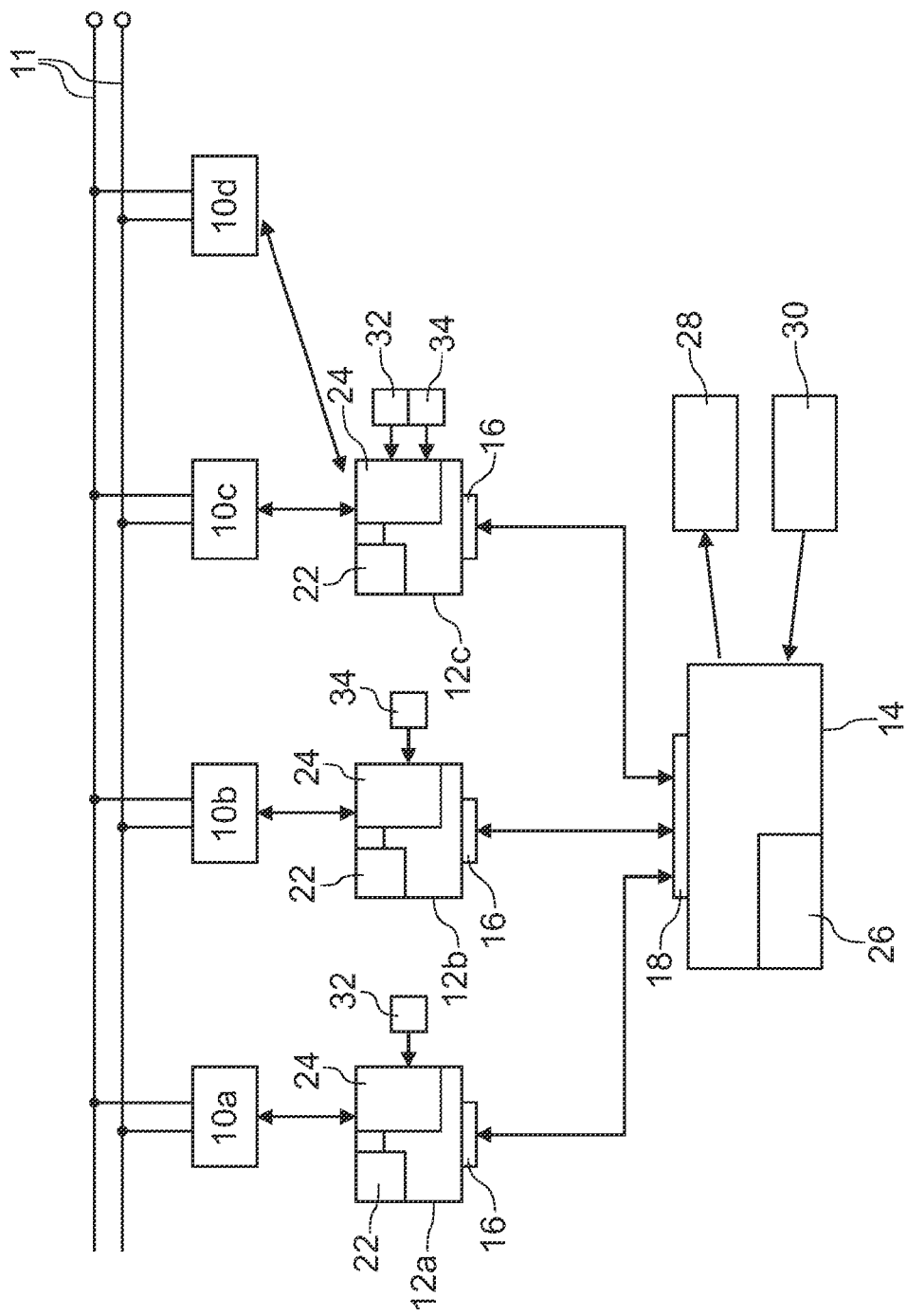

This application claims the priority, under 35 U.S.C. §119, of German patent application DE 10 2010 024 992.0, filed Jun. 24, 2010; the prior application is herewith incorporated by reference in its entirety.

BACKGROUND OF THE INVENTION

Field of the Invention

The present invention relates to an actuator for the power control of at least one connected consumer, and to an energy management system, for example in the form of a building automation system, comprising a plurality of such actuators.

Energy management or building automation systems usually comprise a plurality of electronic apparatuses or components (e.g., luminaires, louvers, etc.), the actuation of which is controlled by actuators or actuating elements assigned to them. A plurality of such actuators are in turn driven centrally by a control unit, wherein one or a plurality of control levels can be present depending on the application.

Conventional systems contain a wire-based communication link between the control unit and the actuators. Furthermore, however, actuators with a radio interface or a mains power line interface for data communication are also known, which is advantageous particularly for the subsequent installation of an energy management system.

Depending on the application, numerous electronic apparatuses or components are driven and managed by the energy management system. In this case, there are typically apparatuses and components having different loads and load behavior, which in part also require different driving arrangements.

By way of example, U.S. Pat. No. 5,572,438 and its counterpart European patent EP 0 801 836 B1 describe an energy management or building automation system comprising numerous actuators for the power control (dimming, switching off) of consumers. There, the actuators can monitor the power consumptions of the connected consumers in order to be able to alter the driving thereof for the purpose of reducing the energy costs.

SUMMARY OF THE INVENTION

It is accordingly an object of the invention to provide an actuator and an energy management system which overcome the above-mentioned disadvantages of the heretofore-known devices and methods of this general type and which provides for an improved actuator for the power control of at least one connected consumer which is suitable for use in an energy management system or building automation system.

With the foregoing and other objects in view there is provided, in accordance with the invention, an actuator for the power control of at least one connected consumer, comprising:

a load detection device for detecting one or both of a load magnitude and a load type of the at least one consumer, the load magnitude or the load type forming a measurement variable relating to a load of the at least one consumer; and a communication interface for receiving at least one manipulated variable for the power control of the at least one consumer and transmitting the measurement variable detected by said load detection device.

In other words, the actuator according to the invention for the power control of at least one connected consumer has a load detection device for detecting a load magnitude and/or a load type of the at least one consumer as a measurement variable relating to the load of the at least one consumer; and a communication interface for receiving at least one manipulated variable for the power control of the at least one consumer and transmitting the measurement variable detected by the load detection device.

By way of the communication interface, the actuator can advantageously be integrated into an energy management system.

Since the actuator has a load detection device for detecting a load magnitude (e.g. small load, medium load, large load) and/or a load type (e.g. resistive, capacitive, inductive) of the at least one consumer as a measurement variable relating to the load of the at least one consumer and, in addition, a communication interface for receiving at least one manipulated variable of the power control of the at least one consumer and for transmitting the measurement variable detected by the load detection device, the actuator itself and a control unit coupled to the actuator can react in a targeted manner to the respective consumer connected to the actuator and thus obtain an optimized driving of the consumer (depending on the load magnitude and load type thereof).

In general, at least one consumer is connected to the actuator, that is to say that, within the scope of the invention, the actuator can control only one consumer or else can control a plurality (e.g. two, three, four, . . . ) of consumers.

In a special case, no consumer is directly connected to the actuator. Such an actuator receives an external switching signal, which it forwards to another actuator in order that the latter switches the directly connected consumer.

Preferably, the load detection device is also configured for detecting a power consumed by the at least one consumer as measurement variable.

In one preferred configuration of the invention, the communication interface is selected from a radio interface and a mains power line interface. As a result, additional wear-based data lines are advantageously obviated, such that the flexibility in the overall system can be increased, the installation outlay can be reduced and the energy management can also be installed subsequently in a simple manner. Moreover, the installed volume can additionally be reduced by space savings in the connection region (as a result of the omission of control lines). In principle, however, the present invention can also be applied to systems having wire-based communication.

In a further configuration of the invention, the actuator furthermore has a control circuit for the power control of the at least one consumer, which control circuit can be operated according to one of at least two control types depending on the measurement variable detected by the load detection device. In this case, said at least two control types are selected from a sinusoidal control, a phase chopping control and a phase gating control. In this way, the power control of the consumer connected to the actuator can be adapted to the present conditions (type of load, power consumption of the consumer).

In one advantageous development, the actuator has at least one supply connection for voltage supply and at least one output, via which a mains voltage fed in can be looped through unchanged.

In other words, a supply connection and an output of an actuator can be embodied multiply, wherein the mains voltage fed in can be looped through unchanged via the output, for example to another actuator. What is advantageous about this configuration is that an external terminal for further connections can be obviated, for example if a further terminal, a socket output or other consumer is intended to be connected directly in two-pole fashion. As a result of the reduction of the number of individual terminal blocks, the space requirement of the installation overall is reduced. As a consequence, in a narrow socket outlet, the installation can also be mounted without complicated exchange of the existing socket outlet for a larger one.

In one preferred alternative, the actuator has at least one electrical control input for feeding in a switching signal of at least one external switching element.

Alongside the communication interface (radio, mains power line or otherwise wire-based communication interface), provision is made of at least one control input connected to the control circuit and serving for feeding in a signal which can be generated by the actuation of a switching element, such as, for example, a switch or pushbutton. What is advantageous about this configuration is that, in parallel with the radio control, an existing environment, or one which is to be newly installed, composed of conventional switches can also be utilized for controlling the actuator.

In a further embodiment, a switching state of the actuator can be altered independently of the polarity of the voltage fed in the at least one control input.

What is particularly advantageous about this embodiment is that an input signal having arbitrary electrical polarity that is fed into the control input brings about a change in a switching state. Thus, by way of example, in state 1 the control input is electrically open, and in state 2 the input can optionally be connected to mains system N or to mains system L. In other words, that polarity which is currently available in the respective installation environment is utilized for signaling the active state.

Advantageously, the at least one control input can be configured in such a way that the switching state can be altered depending on a duration and/or on a state change of a present switching signal of a switching element.

If the actuator is integrated into an existing installation for switching a load, such as, for example, a light in a stairwell, pushbuttons for actuating the load may be present there. Such pushbuttons generate a relatively short pulse as a switching signal, which lasts and is present at the control input for as long as the pushbutton is pressed. The user expects a first pulse of this type to switch on the load, for example a light, and a second pulse of this type to switch off the load again. As an alternative to a pushbutton, a simple switch or a two-way circuit for switching the load can be installed. In this case, the switch generates at the control input a signal which lasts for as long as the load, e.g. a light, is intended to be switched on. It is only after renewed actuation of the switch that the switching signal disappears and the load is switched off. Depending on the type of switching means situated at the location and the duration of the switching signal of said switching means, the control input can be configured by means of software such that a state change (e.g. switching on or switching off) can be effected on account of a short switching signal having a duration of less than approximately one second, such as the switching signal of a pushbutton, or on account of a permanently present switching signal, which differs from the preceding switching signal, such as that of a switch.

In addition or as an alternative thereto, the control input can be configured by means of software such that a state change can be effected on account of a long switching signal having a duration of, for instance, one second or longer. Thus, by way of example, with a switching signal that lasts for a long time, it is possible to alter the power of the consumer proceeding from the instantaneous value. By way of example, the power rises in stages up to the maximum value and then falls again in stages down to a lower threshold value in the case of a lasting or renewed signal. The power can analogously be reduced to the minimum value and increased again up to the upper threshold value.

In a further configuration, the actuator has at least two control inputs, wherein each of said control inputs is assigned a switching element, wherein the control inputs can be configured in such a way that a first switching state is present when a switching signal of a switching element is present at the first control input, and a second switching state is present when a switching signal of a switching element is present at the second control input.

If the switching inputs can be configured such that a specific switching state is set upon actuation of a switching element assigned to the respective switching input, an increase in user-friendliness can advantageously be achieved. Thus, by way of example, a first action, such as raising an electric window shutter, lowering an awning or opening a garage door, is initiated upon actuation of a first pushbutton and the respective opposite action is initiated upon actuation of a second pushbutton.

In one particularly advantageous development, the control inputs can be configured in such a way that the first and second switching states can be set by the switching signal being present briefly and a power that can be fed to a consumer can be altered by a switching signal present over a longer period of time.

By virtue of the possibility of configuring control inputs such that different state changes are linked with different switching signals, it is advantageously possible to realize complex switching operations for a consumer with only one actuator. Thus, by way of example, a consumer, such as a lamp, could be switched on or off by means of a short switching signal—lasting for less than approximately one second—of a first or a second pushbutton, respectively. In addition, a power control of the consumer, for example the brightness control of a lamp, could be effected by means of a long switching signal having a duration of, for instance, one second or longer. Proceeding from the instantaneous value, when a long switching signal is present, the power fed to the consumer is altered in stages with temporal separation. Upon long actuation of the first pushbutton, the power fed to the consumer rises, proceeding from the instantaneous value, until the maximum value, for example, is reached. Upon long actuation of the second pushbutton, the power fed to the consumer falls, proceeding from the instantaneous value, until the minimum value, for example, is reached.

In one preferred alternative, the control inputs can be configured in such a way that a change to the same switching state of the actuator can be initiated, independently of the polarity of a switching signal of a switching element and/or of the control input at which a switching signal of a switching element is present.

What is advantageous about such an actuator is that it can also be used with existing cabling of a house, without additional lines having to be laid. Specifically, in existing cablings, the number of lines often does not suffice in order to be able to generate a switching signal having the necessary polarity which brings about a specific state change. If, by way of example, the light in a stairwell is intended to be switchable using different pushbuttons, it may be the case that only a voltage of the polarity L is present at one pushbutton, whereas only a voltage of the polarity N is present at another pushbutton. On account of the different polarity present at the pushbuttons, a specific state change, for example switching on the light, cannot be realized. By virtue of the individual configurability of each control input, however, it is possible to define a switching signal of arbitrary polarity as an initiator of a specific state change. The light can be switched on by the actuation of an arbitrary pushbutton, independently of the polarity present at the pushbutton.

In addition or as an alternative thereto, the control input can be configured by means of software such that a change to the same state of the actuator can be initiated if a switching signal of arbitrary polarity is present at one of two or more control inputs. The two or more control inputs act as though they were a single control input. Thus, by way of example, a switching signal of the polarity L could be present at the first of the two or more control inputs or a signal of the polarity N could be present at the second of the two or more control inputs. The actuator changes its state independently of which of the control inputs a switching signal is present at.

The above-described actuator of the invention can advantageously be integrated into an energy management system, in particular in the form of a building automation system. This energy management system then comprises a plurality of consumers; at least one control unit; at least one actuator according to the invention, which is assigned to the at least one control unit, or is coupled thereto for the power control of the consumers; and at least one communication link between the at least one control unit and the at least one actuator.

The communication link is usually a bidirectional link, such that, firstly, manipulated variables can be transmitted from the control unit to the actuators and, secondly, the measurement variables detected by the load detection devices of the actuators can be communicated from said actuators to the control unit.

Alongside the level of the actuators and the level of the control unit, depending on the application, the energy management system can contain further levels between the actuators and the control unit and/or above the control unit.

Usually, a control unit is coupled to a plurality of actuators, but it is also possible for only one actuator to be driven by a control unit. Only one control unit or a plurality of control units can be provided in the energy management system. If a plurality of control units are provided, they are typically connected to a central unit and/or to one another.

The communication link is preferably selected from a radio link and a mains power line. Within the scope of the present invention, however, wire-based communication links are also possible, in principle. Moreover, the communication link can also be embodied in different variants, that is to say that, for example, one portion of the actuators can be connected to the control unit via radio, while another portion of the actuators can be connected to the control unit via a mains power line.

In one configuration of the invention, the at least one control unit additionally has an evaluation device for evaluating the measurement variables detected by the load detection devices of the actuators.

In a further configuration of the invention, the at least one control unit is furthermore provided with an output device for outputting the measurement variables detected by the load detection devices of the actuators and/or the evaluation results of the evaluation device.

In yet another configuration of the invention, the at least one control unit is furthermore provided with an input device for inputting manipulated variables for the power control of the input variables relating to consumers connected to the actuators. The input variables can be, for example, desired temperatures, brightnesses and the like of the consumers and times of day of the desired alterations.

In one advantageous development, by means of a switching signal present at the control input of an actuator, the at least one assigned consumer of this and/or of at least one other actuator connected via the communication link can be driven.

In other words, a switching signal present at a control input of an actuator has the effect that not only is it possible for the consumer connected to the actuator to be driven, but, by means of signal transmission via the communication interface, it is possible to cause another actuator to drive the consumer connected to the other actuator. Thus, it is possible, for example, that, upon actuation of a switch connected to an actuator via a first control input, a load, such as a lamp, connected thereto can be switched on and off. In addition or as an alternative thereto, the actuator directs a switching signal via a communication link to another actuator, the load of which, for example a garage door opener, opens or closes the garage door. In an analogous manner, it is also possible for an actuator not to be assigned a dedicated load and to serve merely as a remote control switch.

Another variant provides for an actuation of a switching element to initiate a switching signal which is directed to a control input of an actuator. As a reaction to the switching signal, the actuator initiates a sequence of simultaneous and/or temporally staggered switching operations. By way of example, upon a lamp being switched on in a room, a plurality of ceiling and standard luminaires could be switched on simultaneously. In addition, after some time a fan is switched on, if the light has not been switched off again in the meantime. In a further variant, control inputs of a group of actuators can also be configured such that, upon actuation of an arbitrary switching element, the switching signal of which is present at a control input of an arbitrary actuator, the actuator, via the communication link, drives the group of actuators and initiates the switching sequence provided.

It is also conceivable that only one pushbutton is available in the installation and said pushbutton is intended to control a plurality of actuators and the consumers assigned thereto. In this case, the assignment of the control signal to a control input of a specific actuator can be a predefined pressing sequence. By way of example, briefly actuating the button once can mean that the consumer of the first actuator is switched. Actuation of the button twice briefly in succession would switch the consumer of the second actuator, etc. Any desired pressing sequences are conceivable, which can either be fixedly predefined or trained into the system by the user.

Other features which are considered as characteristic for the invention are set forth in the appended claims.

Although the invention is illustrated and described herein as embodied in an actuator and energy management system comprising such actuators, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

Figure 2:
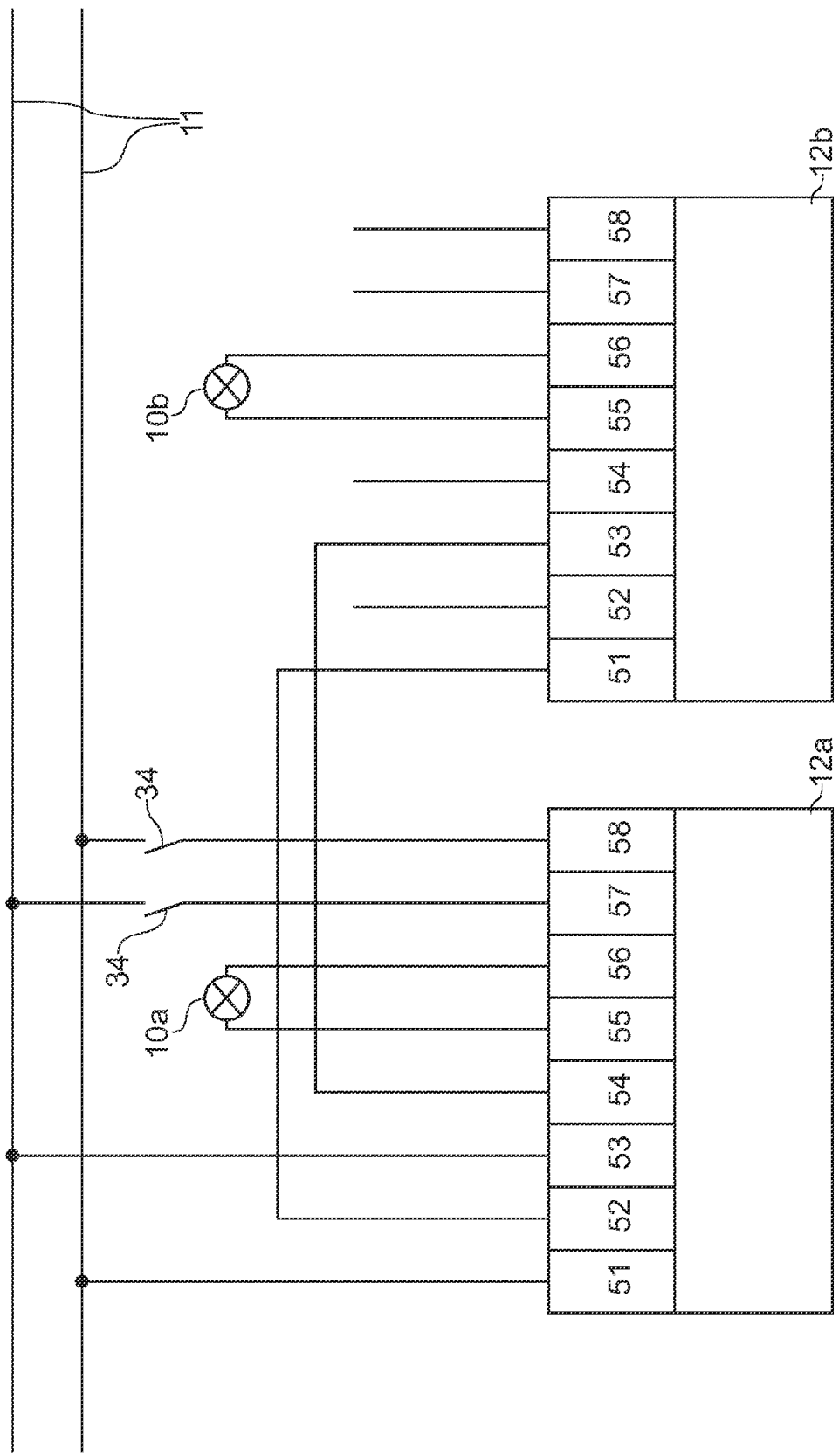

FIG. 1 shows a functional illustration of the configuration of an exemplary energy management system comprising a plurality of actuators according to the present invention; and FIG. 2 shows a schematic illustration of an exemplary interconnection of a plurality of actuators.

DETAILED DESCRIPTION OF THE INVENTION

Referring now to the figures of the drawing in detail and first, particularly, to FIG. 1 thereof, there is shown an exemplary building automation system serving for controlling four electronic consumers 10a, 10b, 10c, 10d. In this case, the consumers 10a . . . d are connected to a power mains 11 in a customary manner.

The first consumer 10a is coupled to a first actuator or actuating element 12a, the second consumer 10b is coupled to a second actuator 12b, and the third and fourth consumers 10c, 10d are coupled to a third actuator 12c.

For their part, the three actuators 12a . . . c are coupled to a control unit 14.

For this purpose, the actuators 12a . . . c each have a first communication interface 16 and the control unit 14 has a second communication interface 18. The second communication interface 18 of the control unit 14 is coupled to the first communication interfaces 16 of the actuators 12a . . . c via a communication link 20. The communication link 20 may be a radio link or a mains power line, for example.

The actuators 12a . . . c, which are embodied as dimmers, for example, are each equipped with a load detection device 22 and a control circuit 24. The load detection devices 22 each serve for automatically detecting measurement variables relating to the load of the consumer 10a . . . d connected to the respective actuator 12a . . . c. The measurement variables include the load magnitude (small load, medium load, large load, etc.) and the load type (resistive, inductive, capacitive) and preferably also the power consumption of the consumer/consumers 10a . . . d. The control circuits 24 each serve for the power control of the connected consumers 10a . . . d.

With the measurement variables obtained by the load detection devices 22, the actuators 12a . . . c can then optimize the driving of the respectively connected consumers 10a . . . d. Thus, the control circuit 24 can drive the consumer/consumers 10a . . . d according to the principle of sinusoidal dimming for example in the case of a small load. The sinusoidal driving of small power consumers 10a . . . d can reduce the harmonic interference on the power mains 11 and thus permit a more cost-effective configuration of electronically regulated consumers.

In the case of larger loads, the control circuits 24 of the actuators 12a . . . c preferably operate according to the phase chopping principle, if the connected consumers 10a . . . d are resistive loads such as, for example, incandescent lamps or capacitive loads such as, for example, energy saving lamps, or according to the phase gating principle if the connected consumers 10a . . . d are inductive loads such as, for example, halogen transformers.

A primary difference between these switching principles is the electronic switching elements. These are predominantly triacs, but also MOSFETs or IGBTs in particular cases, in phase gating controls, whereas MOSFETs or IGBTs are used in phase chopping controls. In the case of these switching elements, the rate of rise or fall of the consumer current can be set during switching on or off. An inductor that is large in the installed volume and such as is usually used in conventional dimmers in order to limit the current rise can be obviated as a result. The control circuits 24 of the actuators 12a . . . c thereby become more compact and more cost-effective.

A control circuit 24 constructed with MOSFETs or IGBTs additionally permits the sinusoidal driving of the load by way of pulse width modulation (PWM). In this case, in the root-mean-square value of the supply voltage, a sinusoidal signal arises which, in contrast with the above-mentioned control methods, causes practically no harmonic distortions on the mains power line 11 and therefore represents the ideal driving for all types of loading. Owing to the absence of a large current gap, it is possible to reduce the size of a buffer capacitor in the power supply unit of an electronic load connected downstream.

In the above-mentioned phase gating method, usually a power switch, at a preselectable triggering angle relative to the sinusoidal mains power half-cycles acquires low impedance and thus closes the electric circuit with a consumer 10a . . . d. In this case, the triggering angle is a measure of the magnitude of a predetermined desired value which is communicated to the actuator 12a . . . c by the control unit 14 for example in the form of a manipulated variable. At the zero crossing of the current through the power switch, the power switch then acquires high impedance again. On the basis of the example of an incandescent lamp this means that a very large switch-on current arises during switch-on for example in the center of a sinusoidal half-cycle, said current leading to audible humming of the incandescent filament. The phase chopping method avoids this current spike by virtue of the fact that the consumer is switched on at the voltage zero crossing and this prevents hard rising of the current. This analogously holds true for the charging current of an intermediate circuit capacitor of power supply units for energy saving lamps. Here, the mains distortions and the power loss in the intermediate circuit capacitor are reduced by the soft switching-on. Therefore, phase chopping control is generally much better suited to the driving of incandescent lamps and more modern luminous means such as energy saving lamps. The phase gating method has advantages when driving inductive loads. In this case, the hard rise in current is reduced by the inductance. On the other hand, an overvoltage spike is avoided during switch-off by virtue of the switching off being effected at the current zero crossing. In the case of a triac, this occurs inherently on account of its component property. In the case of switches such as MOSFETs and IGBTs, the switching off can be controlled in a supervised manner. An ideal switching behavior for all loads could be obtained with sinusoidal driving regulated in terms of amplitude. Pulse width modulation comes close to that technically. However, a higher interference spectrum and an increased switching power loss occur during pulse width modulation on account of numerous switching operations. Therefore, this method is advantageous only for relatively small load currents.

The automatic identification of load type and load magnitude and also the measurement of the consumed power by the load detection devices 22 of the actuators 12a . . . c make it possible to find a suitable driving pattern for the consumers 10a . . . d as described above. In this case, the sinusoidal driving is preferably chosen in the case of a small load. Since, in this case, an increased power loss arises in the switching transistors and the magnitude of the radio interference signals is increased, the system, starting from a specific load value, automatically changes over to phase gating control in the case of an inductive load, otherwise to phase chopping control.

The changeover of the driving principle of the control circuit 24 depending on the measurement variables detected by the load detection device 22 can either be effected by the actuator 12a . . . c itself or be instigated by the control unit 14.

The control unit 14 is equipped with an evaluation device 26 in order to evaluate the measurement variables detected by the load detection devices 22 of the actuators 12a . . . c and, if appropriate, to correspondingly adapt the manipulated variables to be communicated to the actuators 12a . . . c.

Moreover, the control unit 14 is provided with an output device 28 (e.g. display, screen, printer, etc.) and an input device 30 (e.g., keyboard, touchscreen, etc.). By way of example, the measurement variables detected by the load detection devices 22 of the actuators 12a . . . c and/or the evaluation results of the evaluation device 26 of the control unit 14 can be displayed to or printed out for the user via the output device 28. By means of the measurement of the power consumption of the consumers 10a . . . d, the communication of said measurement variables to the control unit 14 and the outputting of said measurement variables or corresponding evaluation results, the user has the possibility, for example, of monitoring the consumption of the consumers connected to the energy management and, if appropriate, adapting the consumption behavior thereof. Moreover, an intelligent regulating system provided in the control unit 14 or in a superordinate central unit can, in an automated manner, influence the powers consumed by the consumers 10a . . . d.

As illustrated in FIG. 1, the actuators 12a . . . c are usually furthermore coupled to sensors 32 and/or switching elements 34, such as switches or pushbuttons, by means of which, by way of example, the ambient brightness can be detected or a luminaire can be switched on directly. In a special case, individual actuators 12a . . . c may have no direct coupling to sensors 32 and/or switching elements 34, but rather are coupled indirectly via the communication interface 16 to sensors 32 and/or switching elements 34 of another actuator 12a . . . c.

FIG. 2 illustrates the schematic interconnection on the basis of the example of two actuators 12a and 12b, in which case the illustration of further actuators 12c . . . z and details shown in FIG. 1 have been omitted for reasons of clarity.

Each actuator 12a and 12b has two supply connections 51 and 53 for feeding in mains voltage and two outputs 52 and 54, wherein the supply connections 51 and 53 of the actuator 12a are connected to the mains power line 11 and the mains voltage fed in can be looped through unchanged to the supply connections 51 and 53 of the actuator 12b via the outputs 52 and 54 of the actuator 12a. Possible further actuators 12c . . . z can likewise be supplied with mains voltage in this way. Alternatively, each actuator 12a . . . z could be directly connected to the mains power line 11 via its supply connections 51 and 53.

Each actuator 12a and 12b has two connections 55 and 56 for supplying a consumer 10a and 10b, respectively, with voltage, which consumer can be controlled by means of an actuator 12a or 12b.

Furthermore, each actuator 12a and 12b has two control inputs 57 and 58, which, on the one hand, are connected to the control circuit 24 of the respective actuator 12a, 12b and, on the other hand, can be connected to a sensor 32 and/or a switching element 34, such as a switch or pushbutton. A switching signal is generated by means of the actuation of the switching element 34 or by means of a sensor signal and said switching signal is fed into the actuator 12a, 12b.

The possible number of supply connections 51, 53, of outputs 52, 54, of connections 55, 56, of consumers 10a, 10b, of control inputs 57, 58, of sensors 32 and of switching elements 34 is not restricted.

The invention claimed is:

1. An actuator for integration in a monitored system having a central control unit and a plurality of controlled consumers, the actuator controlling a power of at least one consumer connected thereto, the actuator comprising:
 a load detection device for detecting a load magnitude and a load type of the at least one consumer, the load magnitude forming a load measurement variable relating to a load of the at least one consumer and the load type being selected from the group consisting of a resistive load, a capacitive load and an inductive load;
 a control circuit for controlling a power of the at least one consumer, said control circuit being configured for operation in at least two control types selected from the group consisting of a sinusoidal control, a phase chopping control and a phase gating control, said control circuit being connected to receive from said load detection device information regarding the load type and being configured to drive the at least one consumer in accordance with one of a plurality of control types depending on the load type detected by said load detection device; and
 a communication interface for connecting the actuator to the central control unit for transmitting the load measurement variable detected by said load detection device to the central control unit and for receiving from the central control unit at least one manipulated variable for the power control of the at least one consumer.

2. The actuator according to claim 1, wherein said control circuit is operable according to a control type selected from the group consisting of a sinusoidal control, a phase chopping control, and a phase gating control.

3. The actuator according to claim 1, which comprises at least one supply connection for voltage supply and at least one output, and wherein a mains voltage fed in can be looped through via said output unchanged.

4. The actuator according to claim 1, which comprises at least one electrical control input for feeding in a switching signal of at least one external switching element.

5. The actuator according to claim 4, wherein a switching state of the actuator can be altered independently of a polarity of a voltage present at the at least one electrical control input.

6. The actuator according to claim 4, wherein said at least one control input is configurable in such a way that the switching state can be altered depending on a duration and/or on a state change of a present switching signal of a switching element.

7. The actuator according to claim 4, wherein said at least one control input is one of at least two control inputs including a first control input and a second control input, each of said control inputs is assigned a switching element, said control inputs are configurable such that a first switching state is present when a switching signal of a switching element is present at said first control input, and a second switching state is present when a switching signal of a switching element is present at said second control input.

8. The actuator according to claim 7, wherein said control inputs are configurable such that the first and second switching states can be set by the switching signal being present briefly and a power that can be fed to a consumer can be altered by a switching signal present over a longer period of time.

9. The actuator according to claim 4, wherein said control inputs are configurable such that a change to the same switching state of the actuator can be initiated, independently of a polarity of a switching signal of the switching element and/or of the control input at which a switching signal of a switching element is present.

10. An energy management system, comprising:
 a plurality of consumers;
 a plurality of actuators according to claim 1, each connected to a respective one of said consumers, for a power control of said consumers;
 at least one central control unit; and a communication link between said at least one central control unit and each of said plurality of actuators, said communication link transmitting from a respective said actuator to said central control unit a measurement variable representing a load of the at least one consumer connected to said actuator and transmitting from said central control unit to said actuator a manipulated variable for the power control of the at least one consumer connected to said actuator.

11. The energy management system according to claim 10, configured as a building automation system.

12. The energy management system according to claim 10, wherein said at least one central control unit is provided with an evaluation device for evaluating the measurement variables detected by respective load detection devices of said actuators.

13. The energy management system according to claim 12, wherein said at least one central control unit includes an output device for outputting measurement variables detected by said load detection devices of said actuators and/or evaluation results of said evaluation device.

14. The energy management system according to claim 10, wherein said at least one central control unit is provided with an input device for inputting manipulated variables for the power control of the input variables relating to said consumers connected to said actuators.

15. The energy management system according to claim 10, wherein the at least one consumer assigned to a respective actuator and/or of at least one other actuator that is connected thereto via said communication link is driven by way of a switching signal present at said control input of the respective actuator.

16. The energy management system according to claim 10, wherein an actuator has at least one control input, an activation of which has the effect that, by way of said communication interface, in the case of a control signal characterized by a first actuation sequence, at least one first consumer of at least one arbitrary actuator or the directly connected consumer is switched, and that, in the case of a control signal characterized by a second actuation sequence, at least one second consumer of at least one arbitrary actuator is switched.

17. An actuator for integration in a monitored system having a central control unit and a plurality of controlled consumers, the actuator controlling a power of at least one consumer connected thereto, the actuator comprising:
 a load detection device for detecting one or both of a load magnitude and a load type of the at least one consumer, the load type being a resistive load, a capacitive load, or an inductive load, and the load magnitude or the load type forming a measurement variable relating to a load of the at least one consumer;
 a communication interface for connecting the actuator to the central control unit and for receiving from the central control unit at least one manipulated variable for the power control of the at least one consumer and for transmitting the measurement variable detected by said load detection device to the central control unit; and
 at least two control inputs including a first control input and a second control input, each of said control inputs being assigned a switching element, and said control inputs being configurable such that a first switching state is present when a switching signal of a switching element is present at said first control input, and a second switching state is present when a switching signal of a switching element is present at said second control input.

18. The actuator according to claim 17, wherein said control inputs are configurable such that the first and second switching states can be set by the switching signal being present briefly and a power that can be fed to a consumer can be altered by a switching signal present over a longer period of time.

* * * * *